United States Patent

[11] 3,626,066

[72] Inventor Grover Cleveland Helsley
Richmond, Va.
[21] Appl. No. 4,092
[22] Filed Jan. 19, 1970
[45] Patented Dec. 7, 1971
[73] Assignee A. H. Robins Company, Incorporated
Richmond, Va.
Original application Dec. 13, 1967, Ser. No. 690,097, now Patent No. 3,523,950.
Divided and this application Jan. 19, 1970, Ser. No. 4,092

[54] ARYLPYRIDINYL-ALKYL ALCOHOL DERIVATIVES IN COMPOSITIONS AND METHODS FOR TRANQUILIZING MAMMALS
9 Claims, No Drawings

[52] U.S. Cl. .................................................... 424/263
[51] Int. Cl. ...................................................... A61k 27/00
[50] Field of Search .......................................... 260/295 R; 424/263

[56] References Cited
UNITED STATES PATENTS
3,426,031 2/1969 Fischback .................... 260/295

Primary Examiner—Stanley J. Friedman
Attorneys—G. William King and Norman D. Dawson ABSTRACT: There are disclosed compositions of matter classified in the art of chemistry as derivatives of arylpyridinyl-alkyl alcohols as well as processes for making and using such compositions.
The novel chemical compounds are represented by the following formula:

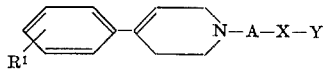

wherein $R^1$ represents hydrogen, lower alkyl, lower alkoxy or trifluoromethyl; A represents alkylene having two to four carbon atoms; X represents —O—C(o)—; Y represents phenyl, trifluoromethylphenyl, lower-alkoxyphenyl, and $NHR^2$ wherein $R^2$ represents hydrogen, lower alkyl, phenyl, trifluoromethylphenyl and lower-alkoxyphenyl.
The pharmaceutically acceptable acid addition salts of the arylpyridinyl-alkyl alcohol derivatives embraced by the above formula are also included within the scope of this invention.

ARYLPYRIDINYL-ALKYL ALCOHOL DERIVATIVES IN COMPOSITIONS AND METHODS FOR TRANQUILIZING MAMMALS

This is a division of copending application Ser. No. 690,097, filed Dec. 13, 1967 now U.S. Pat. No. 3,523,950.

The present invention relates to compositions of matter classified in the art of chemistry as arylpyridinyl-alkyl alcohol derivatives and to processes for making and using such compositions.

The compounds of this invention are represented by the following formula:

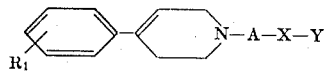

Formula I wherein;

$R^1$ represents hydrogen, lower alkyl, lower alkoxy and trifluoromethyl; A represents alkylene having two to four carbon atoms; X represents —O—C(O)—; and Y represents phenyl, trifluoromethylphenyl, lower-alkoxyphenyl and $NHR^2$ wherein $R^2$ represents hydrogen, lower alkyl, phenyl, trifluoromethylphenyl and lower-alkoxyphenyl.

The chemical compounds having a molecular structure corresponding to the following formula:

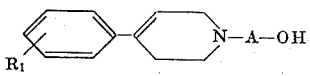

Formula II wherein $R^1$ and A are as above defined represent compounds useful as starting materials in the preparation of the novel compounds represented by formula I.

The pharmaceutically acceptable acid addition salts of the compounds of formula I are also included within the scope of this invention. The salts have the advantages of water solubility, heat solubility, or both, as compared with the free bases from which they are derived. Both organic and inorganic acids can be employed to form pharmaceutically acceptable salts with the various arylpyridinyl-alkyl bases, illustrative acids being hydrochloric acid, hydrobromic acid, sulfuric acid, phosphoric acid, maleic acid, acetic acid, benzoic acid, succinic acid, citric acid, ascorbic acid, and the like.

While all of the compounds corresponding to formula I possess therapeutic activity as tranquilizing agents as demonstrated by accepted experimental procedures [DaVanzo, J. P. et al., Psychopharmacologia 9, 210 (1966)], the compounds of Examples 3, 6, and 10 are preferred. The above examples have, respectively, an $ED_{50}$ of 7.1, 5.8 and 8.5 mg./kg. The $ED_{50}$ was determined by the injection of the appropriate number of doses to mice and subjecting the results to probit analysis according to the method of J. T. Litchfield and F. Wilcoxon, J. Pharm. and Exptl. Therap., 96, 99 (1949).

In the definition of the symbols in the foregoing formulas I and II, and where they appear elsewhere throughout the specification and claims hereof, the terms used herein have the following significance.

The term "lower alkyl" includes straight and branched chain radicals of up to eight carbon atoms inclusive and its exemplified by such groups as methyl, ethyl, propyl, butyl, isobutyl, tertiary butyl, amyl, isoamyl, hexyl, heptyl, octyl, and the like.

The term "lower alkoxy" has the formula —O— lower alkyl.

A "substituted phenyl" radical is a phenyl radical substituted by any radical or radicals which are not reactive or otherwise interfering under the conditions of reaction in preparing the desired compound, such radicals including lower alkoxy, lower alkyl, di-lower-alkylamino, trifluoromethyl, and the like. The foregoing substituents can be in various available positions of the phenyl nucleus.

The starting materials (formula II) can be prepared according to the following general procedures.

The precursor materials of formula II, the 4-aryl-1,2,3,6-tetrahydropyridines, are in some instances commercially available or they can be readily prepared by standard laboratory procedures as hereinafter described.

Commercially available 1-benzyl-4-pyridone is dissolved in anhydrous ether and the ethereal solution is added to a stirred ethereal mixture of a suitable Grignard reactant as, for example, an aryl magnesium bromide to give the corresponding 1-benzyl-4-hydroxy-4-aryl pyridine. Catalytic hydrogenolysis of the aforementioned material in a suitable solvent as, for example, a lower alkanol at 2–3 atmospheres of hydrogen and at a temperature from about 20° C. to about 80° C. using a palladium on charcoal catalyst gives 4-hydroxy-4-aryl pyridine. The isolated debenzylated material is gently refluxed in 2–8 normal hydrochloric acid for from about 3 hours to about 24 hours. Hydrochloric acid of about 6 normal is preferably used. The reflux period is dependent on the material being dehydrated, the minimum period necessary to obtain complete dehydration being preferred to prevent deleterious results due to a prolonged period of reflux. Basification of the acidic hydrolyzate and extraction of the basic mixture using a suitable solvent such as ether, benzene, ethyl acetate, and the like and evaporation of the solvent leaves the crude 4-aryl-1,2,3,6-tetrahydropyridine which can be purified by suitable methods as, for example, distillation.

The reaction of a 4-aryl-1,2,3,6-tetrahydropyridine and an omega-halo alkanol in a lower alkanol solvent such as ethanol in the presence of an acid acceptor as, for example, sodium carbonate, sodium acid carbonate, potassium carbonate and the like and at the reflux temperature of the lower alkanol solvent gives the desired 1-(ω-hydroxyalkyl-4-aryl-1,2,3,6-tetrahydropyridine corresponding to formula II.

The compounds corresponding to formula I wherein X is —O—C(O)— can be prepared by the following general methods.

A stirred solution of a 4-aryl-1-(ω-hydroxyalkyl)-1,2,3,6-tetrahydropyridine in a dry non-reactive organic solvent such as benzene, toluene, xylene, and the like, is treated with a solution of an aryl carbamyl halide, a lower alkyl isocyanate, an aryl isocyanate or an aroyl halide in a dry organic solvent as hereinbefore mentioned, benzene being the preferred solvent. The addition is carried out slowly at or near room temperature and, optionally, under an atmosphere of an inert gas, preferably nitrogen. Subsequent to the addition the reaction mixture is stirred from about 12 hours to about 40 hours at ambient temperature or at gentle reflux. Generally speaking, a reaction period of 14 to 16 hours at ambient temperature is sufficient to complete the reaction. It is only necessary to use longer reaction times and higher temperatures when less reactive materials are used. Isolation of the product is readily effected by evaporation of the solvent and crystallization of the crude residue using an appropriate solvent.

The following examples are illustrative only and should not be construed as limiting the invention which is properly delineated in the appended claims.

EXAMPLE 1

1-(3-Hydroxypropyl)-4-phenyl-1,2,3,6-tetrahydropyridine hydrochloride

A mixture of 79.5 g. (0.5 mole) of 4-phenyl-1,2,3,6-tetrahydropyridine, 69.5 g. (0.5 mole) of trimethylene bromohydrin, 50 g. of potassium carbonate and 400 ml. of absolute ethanol was heated at reflux for 3 hours, filtered and the solvent evaporated at reduced pressure. The residual oil was made basic with 50 percent sodium hydroxide and thereafter extracted with chloroform. The combined extracts were washed with water and the solvent evaporated. The residual oil was distilled at reduced pressure and the fraction boiling at 138°–140° C./.01 mm. collected. The colorless viscous oil distillate crystallized on standing, weighed 38.4 g. (36 percent yield) and melted at 45–47° C. A portion (5.0 g.) of the free base was dissolved in dry ether and treated with an ether-hydrogen chloride solution. The white crystalline hydrochloride salt which formed on standing was recrystallized from an isopropanol-isopropyl-ether mixture. The compound weight 4.1 g. and melted at 129–130° C.

Analysis: Calculated for $C_{14}H_{20}NOCl$: C,66.26; H,7.94; N,5.52

Found: C,66.15; H,7.90; N,5.51

Utilizing the method of example 1, the following compounds are prepared from the stated ingredients:

1-(2-hydroxyethyl)-4-phenyl-1,2,3,6-tetrahydropyridine from 4-phenyl-1,2,3,6-tetrahydropyridine and 2-bromoethanol;

4-(4-ethylphenyl)-1-(3-hydroxypropyl)-1,2,3,6-tetrahydropyridine from 4-(4-ethylphenyl)-1,2,3,6-tetrahydropyridine and trimethylene bromohydrin; and 1-(3-hydroxypropyl)-4-(4-methoxyphenyl)-1,2,3,6-tetrahydropyridine from 4-(4-methoxyphenyl)-1,2,3,6-tetrahydropyridine and trimethylene bromohydrin.

EXAMPLE 2

1-(3-Hydroxypropyl)-4-(m-trifluoromethylphenyl)-1,2,3,6-tetrahydropyridine hydrochloride A mixture of 37.0 g. (0.16 mole) of 4-(m-trifluoromethylphenyl)-1,2,3,6-tetrahydropyridine, 22.2 g. (0.16 mole) of trimethylene bromohydrin, 40 g. of potassium carbonate and 500 ml. of dry toluene was stirred two hours at room temperature and then at reflux for six hours. Water (200 ml.) was added to the cooled reaction mixture and the organic layer separated. The separated organic layer was washed with water and the solvent evaporated. The residual oil was distilled under vacuum, and the fraction boiling at 124°–128° C./0.01 mm. was collected. The viscous oil weighed 19 g. (42 percent yield). A portion of the free base (2.0 g.) was dissolved in isopropanol and treated with an ether-hydrogen chloride solution. The white crystalline solid which formed immediately was recrystallized from isopropanol. The compound weighed 1.4 g. and melted at 219°–221° C. The melting point was unchanged after the salt was recrystallized again from the same solvent.

Analysis: Calculated for $C_{15}H_{19}F_3NOCl$: C,55.99, H,5.95; N,4.35

Found: C56.05; H,5.75; N,4.27

EXAMPLE 3

1-(3-Methylcarbamoyloxypropyl)-4-phenyl-1,2,3,6-tetrahydropyridine hydrochloride To a solution of 15.2 g. (0.07 mole) of 1-(3-hydroxypropyl)-4-phenyl-1,2,3,6-tetrahydropyridine in 200 ml. of dry benzene there was added slowly a solution of 4.0 g. (0.07 mole) of methyl isocyanate in 30 ml. of dry benzene. The resulting solution was stirred for 16 hours at ambient temperature and the solvent was thereafter evaporated. The residue was dissolved in hot benzene and treated with isooctane. The white crystalline product which separated on cooling weighed 7.1 g. (37 percent yield) and melted at 84°–85° C. A portion (1.0 g.) of the free base was dissolved in ether and treated with an ether-hydrogen chloride solution. The crystalline product which formed on standing was recrystallized from isopropanol. The white solid weighed 1.0 g. and melted at 167°–168°C.

Analysis: Calculated for $C_{16}H_{23}N_2O_2Cl$: C,61.82; H,7.46; N,9.01;

Found: C,62.03; H,7.40; N,9.00

EXAMPLE 4

1-[3-(3,4,5-Trimethoxyphenylcarbamoyloxy)-propyl]-4-phenyl-1,2,3,6-tetrahydropyridine Into a stirred solution of 3.3 g. (0.015 mole) of 1-(3-hydroxypropyl)-4-phenyl-1,2,3,6-tetrahydropyridine in 50 ml. of dry benzene at 25° C., there was introduced slowly 3.1 g. (0.015 mole) of 3,4,5-trimethoxyphenyl isocyanate in 10 ml. of dry benzene. The mixture was stirred for 16 hours at ambient temperature and then treated with 100 ml. of isooctane. The tan crystalline product which formed was separated by filtration; a benzene solution of the tan product was treated with charcoal, and the solution filtered. The resulting white compound which was precipitated by the addition of isooctane to the benzene filtrate melted at 125°–126° C. and weighed 4.5 g. (70 percent yield).

Analysis: Calculated for $C_{24}H_{30}N_2O_5$: C,67.58; H,7,09; N,6.57

Found: C,67.69; H,7.26; N,6.66

Example 5

1-[3-(3,4,5-Trimethoxybenzoyloxy)propyl]-4-phenyl-1,2,3,6tetrahydropyridine

A mixture of 6.5 g. (0.03 mole) of 1-(3-hydroxypropyl)-4-phenyl-1,2,3,6-tetrahydropyridine, 6.9 g. (0.03 mole) of 3,4,5-trimethoxybenzoyl chloride and 100 ml. of chloroform was refluxed gently for 16 hours. After the solvent was distilled off at reduced pressure, the residual oil crystallized on standing and the solid was recrystallized from an ethyl acetate-isopropanol mixture. The white product which was recovered melted at 144.5°–147.5° C. and weighed 7.8 g. (58 percent yield). The analytical sample melted at 146–148° C. following recrystallization from the same solvent system.

Analysis: calculated for $C_{24}H_{30}NO_5cl$. C, 64.35; H,6.75; N,3.13

Found: C,64.42; H,6.78; N,3.14

Utilizing the method described above in example 5, 1-(3-benzoyloxypropyl)-4-phenyl-1,2,3,6-tetrahydropyridine is prepared using benzoyl chloride instead of 3,4,5-trimethoxybenzoyl chloride.

EXAMPLE 6

1-(3-Ethylcarbamoyloxypropyl)-4-phenyl-1,2,3,6-tetrahydropyridine hydrochloride

To a stirred solution of 4.3 g. (0.02 mole) of 1-(3-hydroxypropyl)-4-phenyl-1,2,3,6-tetrahydropyridine in 50 ml. of dry benzene, there was added slowly a solution of 1.4 g. (0.02 mole) of ethyl isocyanate in 15 ml. of dry benzene. The resulting solution was stirred for 40 hours at room temperature and finally refluxed for 1 hour. After the solvent had been evaporated, the residue crystallized. It was recrystallized from an isooctane-benzene mixture. The product weighed 4.1 g. (72 percent yield) and melted at 80°–81° C. A portion (1.0 g.) of the free base was dissolved in ether and treated with an ether-hydrogen chloride solution. The crystalline product which formed on standing was recrystallized from isopropanol-isopropyl ether. The white solid weighed 1.1 g. and melted at 157°–158° C.

Analysis: Calculated for $C_{17}H_{25}ClN_2O_2$: C,62.85; H,7.76; N,8.63

Found: C,62.95; H,7.93; N,8.48

EXAMPLE 7

1-(3-Phenylcarbamoyloxypropyl)-4-phenyl-1,2,3,6-tetrahydropyridine.

To a solution of 3.2 g. (0.015 mole) of 1-(3-hydroxypropyl)-4-phenyl-1,2,3,6-tetrahydropyridine in 50 ml. of dry benzene at 25° C., there was added slowly a solution of 1.8 g. (0.015 mole) of phenyl isocyanate in 10 ml. of dry benzene. The resulting solution was stirred for 16 hours under an atmosphere of nitrogen at ambient temperature and then treated with 50 ml. of isooctane. The white crystalline product which thereby formed was separated by filtration and recrystallized from a benzene-isooctane mixture. The product melted at 141°–143° C. and weighed 4.0 g. (73 percent yield).

Analysis: Calculated for $C_{21}H_{24}N_2O_2$: C,74.97; H,7.19; N,8.33

Found: C,74.76; H,7.26; N,8.49

EXAMPLE 8

1-(3-Phenylcarbamoyloxypropyl)-4-(m-trifluoromethylphenyl)-1,2,3,6tetrahydropyridine To a stirred solution of 5.7 g. (0.02 mole) of 1-(3-hydroxypropyl)-4-(m-trifluormethylphenyl)-1,2,3,6-tetrahydropyridine in 50 ml. of dry benzene at 25° C., there was slowly added a solution of 2.4 g. (0.02 mole) of phenyl isocyanate in 25 ml. of dry benzene. The resulting solution was stirred under an atmosphere of nitrogen at ambient temperature for 16 hours. After the solvent was evaporated at reduced pressure, the residual oil was treated with 50 ml. of isooctane. The crystalline product was separated by filtration and recrystallized from isooctane. The white compound weighed 7.0 g. (86 percent yield) and melted at 100°–101° C.

Analysis: Calculated for $C_{22}H_{23}N_2O_2F_3$: C,65.35; H,5.73; N,6.93
Found: C,65.29; H,5.51; N,6.92

EXAMPLE 9

1-[3-(3,4,5-Trimethoxyphenylcarbamoyloxy) propyl]-4-(m-trifluoromethylphenyl)-1,2,3,6-tetrahydropyridine hydrochloride To a stirred solution of 3.6 g. (0.012 mole) of 1-(3-hydroxypropyl)-4-(m-trifluoromethylphenyl)-1,2,3,6-tetrahydropyridine in 50 ml. of dry benzene at 25° C., there was added slowly a solution of 2.6 g. (0.012 mole) of 3,4,5-trimethoxyphenyl isocyanate in 20 ml. of dry benzene. The mixture was stirred for 16 hours at ambient temperature, filtered and the solvent evaporated at reduced pressure. The free base was dissolved in ether and treated with an ether hydrogen chloride solution. The crystalline compound which formed on standing was separated by filtration and recrystallized from an isopropanol-isopropyl ether mixture. The white salt which was obtained weighed 3.7 g. (59 percent yield) and melted at 164°–165° C.

Analysis: Calculated for $C_{25}H_{30}ClF_3N_2O_5$: C,56.55; H,5.69; N,5.28
Found: C,56.30; H,5.63; N,5.32

EXAMPLE 10

1-(3-Methylcarbamoyloxypropyl)-4-(m-trifluoromethylphenyl)-1,2,3,6-tetrahydropyridine hydrochloride To a stirred solution of 5.7 g. (0.02 mole) of 1-(3-hydroxypropyl)-4-(m-trifluoromethylphenyl)-1,2,3,6-tetrahydropyridine in 50 ml. of dry benzene at 25° C., there was slowly added a solution of 1.7 g. (0.03 mole) of methyl isocyanate in 15 ml. of dry benzene. The resulting solution was stirred for 16 hours at ambient temperature and then the solvent was evaporated. The residue which crystallized on standing weighed 5.8 g. (88 percent yield) and melted at 60°–64° C. The free base was dissolved in ether and treated with an ether-hydrogen chloride solution. The crystalline product which formed was recrystallized from an isopropanol-isopropyl ether mixture. The white salt thereby obtained melted at 159°–161° C. and weighed 4.2 g.

Analysis: Calculated for $C_{17}H_{22}ClF_3N_2O_2$: C,53.90; H,5.85; N,7.40
Found: C,53.74; H,5.73; N,7.32

Utilizing the method of Example 10, the following compounds are prepared from the stated ingredients:

1-(3-methylcarbamoyloxypropyl)-4-(4-ethyphenyl)-1,2,3,6-tetrahydropyridine from 4-(4-ethylphenyl)-1-(3-hydroxypropyl)-1,2,3,6-tetrahydropyridine and methyl isocyanate:

1-(3-phenylcarbamoyloxypropyl)-4-(4-methoxyphenyl)-1,2,3,6-tetrahydropyridine from 1-(3-hydroxypropyl)-4(4-methoxyphenyl)-1,2,3,6-tetrahydropyridine and phenyl isocyanate;

1-(2-phenylcarbamoyloxyethyl)-4-phenyl-1,2,3,6-tetrahydropyridine from 1-(2-hydroxyethyl)-4-phenyl-1,2,3,6-tetrahydropyridine and phenyl isocyanate; and 1-(4-phenylcarbamoyloxybutyl)-4-phenyl-1,2,3,6-tetrahydropyridine from 1-(4-hydroxybutyl)-4-phenyl-1,2,3,6-tetrahydropyridine and phenyl isocyanate.

The following procedure illustrates the process of administering an arylpyridinyl-alkyl alcohol derivative represented by formula I to a mammalian host having symptomology diagnosed as requiring tranquilizing or hypotensive treatment but not requiring restraint.

A capsule or tablet or other pharmaceutical form containing an effective dose of the medicament in the solid state, for example, from 5 to 50 mg. is administered via the oral route every four to six hours, or more often if need be. Initially, it is sometimes desirable to give a large dose, for example, one, two or three times the above dose, in order to obtain a pronounced initial effect. For example, for a host weighing 60–70 kg., a dose of from about 0.35 mg./kg./day to about 1.5 mg./kg./day is sufficient to give the required therapeutic effect.

The initial and subsequent doses of arylpyridinyl-alkyl alcohol derivative tranquilizer can also be administered parenterally by intramuscular or subcutaneous injection when desired. A water-soluble salt of an arylpyridinyl-alkyl alcohol derivative is particularly useful for purposes of injection. In general, the dose required for parenteral administration is somewhat less than that required to provide an equal effect by oral administration.

A further mode of evoking tranquilizing action by the administration of an arylpyridinyl-alkyl alcohol derivative is that of maintaining a small daily maintenance dose of about 0.35 mg./kg./day to about 0.70 mg./kg./day but increasing this dose in times of stress.

The various pharmaceutical forms referred to above are prepared by methods well known to the art. For example, a solid dosage form can comprise s gelatin capsule containing a dose amount of a compound of Formula I mixed with a quantity of starch or other solid pharmaceutical extending medium. Alternatively, a binder such as stearic acid or magnesium stearate can be added to the mixture of starch and drug and the whole pressed into tablet form. Parenteral dosage forms are obtained by dissolving a water-soluble salt of the active drug in water or saline solution in a concentration such that 1 cc. of the solution can be filled into 1 cc. ampul or larger multiple-dose ampuls.

The following examples illustrate the preparation of suitable dosage forms.

Filled gelatin capsules can be prepared by mixing 1 pound of 1-(3-methylcarbamoyloxypropyl)-4-phenyl-1,2,3,6-tetrahydropyridine hydrochloride with 63 pounds of starch and filling the mixture into empty telescoping capsules of such size that each capsule contains 5 mg. of drug.

Tablets can be prepared as follows: 20 parts of 1-(3-methylcarbamoyloxypropyl)-4-phenyl-1,2,3,6-tetrahydropyridine; 35 parts of starch; 35 parts of milk sugar; 4 parts of sodium carboxymethylcellulose and one part of magnesium stearate (all parts by weight) are thoroughly mixed and the mixture is then compressed into scored 100 mg. tablets, each tablet containing 20 mg. of the active drug.

Ampuls containing an injectable solution are prepared as follows: 50 liters of a solution containing 5 mg. per ml. of 1-(3-methylcarbamoyloxypropyl)-4-phenyl-1,2,3,6-tetrahydropyridine in the form of its hydrochloride salt is prepared in distilled water, and 5 mg. of sodium chloride per ml. are dissolved therein to provide a substantially isotonic solution. The solution is sterilized by filtering it through a Seitz filter, and is then filled with aseptic technique into one cc. ampuls.

Various modifications and equivalents will be apparent to one skilled in the art and may be made in the compounds, methods, compositions and procedures of the present invention without departing from the spirit or scope thereof, and it is therefore to be understood that the invention is to be limited only by the scope of the appended claims.

What is claimed is:

1. A process which comprises administering to a mammalian host, for its tranquilizing effect, an effective amount of a compound of the formula:

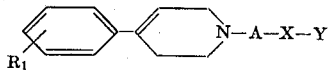

wherein;
$R^1$ is a member selected from the group consisting of hydrogen, lower alkyl, lower alkoxy and trifluoromethyl,
A is alkylene having two to four carbon atoms,
X is —O—C(O)—, and
Y is $NHR^2$ wherein $R^2$ is selected from the group consisting of hydrogen, lower alkyl, phenyl, trifluoromethylphenyl and lower-alkoxyphenyl.

2. A process according to claim 1 wherein the active ingredient is administered together with a pharmaceutically acceptable carrier therefor and in an amount of about 5 to 50 milligrams.

3. The process according to claim 2 wherein the active ingredient is 1-(3-methylcarbamoyloxypropyl)-4-phenyl-1,2,3,6-tetrahydropyridine.

4. The process according to claim 2 wherein the active ingredient is 1-(3-ethylcarbamoyloxypropyl)-4-phenyl-1,2,3,6-tetrahydropyridine.

5. The process according to claim 2 wherein the active ingredient is 1-(3-methylcarbamoyloxypropyl)-4-(m-trifluoromethylphenyl)-1,2,3,6-tetrahydropyridine.

6. A pharmaceutical composition useful for its tranquilizing effect comprising (a) an effective amount of about 5 to 50 milligrams of a compound

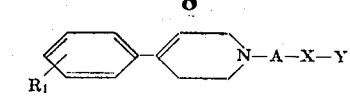

wherein;
$R^1$ is a member selected from the group consisting of hydrogen, lower alkyl, lower alkoxy and trifluoromethyl,
A is a member selected from the group consisting of alkylene having two to four carbon atoms,
X is —O—C(O)—,
Y is $NHR^2$ wherein $R^2$ is selected from the group consisting of hydrogen, lower alkyl, phenyl, trifluoromethylphenyl and lower-alkoxyphenyl, and (b) a pharmaceutically acceptable carrier thereof.

7. A composition according to claim 6 useful for its tranquilizing effect wherein the active ingredient is 1-(3-methylcarbamoyloxypropyl)-4-phenyl-1,2,3,6-tetrahydropyridine.

8. A composition according to claim 6 useful for its tranquilizing effect wherein the active ingredient is 1-(3-ethycarbamoyloxypropyl)-4-phenyl-1,2,3,6-tetrahydropyridine.

9. A composition according to claim 6 useful for its tranquilizing effect wherein the active ingredient is 1-(3-methylcarbamoyloxypropyl)-4-(m-trifluromethylphenyl)-1,2,3,6-tetrahydropyridine.

* * * * *